United States Patent
Buist, III

(10) Patent No.: US 11,922,438 B1
(45) Date of Patent: Mar. 5, 2024

(54) SEMANTIC GRAPH DATABASE CAPTURE OF INDUSTRIAL ORGANIZATION AND MARKET STRUCTURE

(71) Applicant: Wells Fargo Bank, N.A., San Francisco, CA (US)

(72) Inventor: Henry Buist, III, Mount Pleasant, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/645,934

(22) Filed: Dec. 23, 2021

Related U.S. Application Data

(63) Continuation of application No. 15/679,866, filed on Aug. 17, 2017, now Pat. No. 11,238,468.

(51) Int. Cl.
G06Q 30/0201 (2023.01)
G06F 16/951 (2019.01)

(52) U.S. Cl.
CPC ....... G06Q 30/0201 (2013.01); G06F 16/951 (2019.01)

(58) Field of Classification Search
CPC .................................................. G06Q 30/02
See application file for complete search history.

(56) References Cited

U.S. PATENT DOCUMENTS

| | | | |
|---|---|---|---|
| 2010/0082386 A1* | 4/2010 | Cao | G06Q 10/06395 705/7.39 |
| 2011/0213659 A1 | 9/2011 | Fontoura et al. | |
| 2014/0215477 A1* | 7/2014 | Chen | G06F 9/5066 718/102 |
| 2016/0247175 A1 | 8/2016 | Milton et al. | |
| 2018/0082183 A1* | 3/2018 | Hertz | G06N 5/00 |

OTHER PUBLICATIONS

Gema Bello-Orgaz, Jason J. Jung, David Camacho, Social big data: Recent achievements and new challenges, Information Fusion,vol. 28, 2016, pp. 45-59,ISSN 1566-2535, https://doi.org/10.1016/j.inffus. 2015.08.005. (Year: 2016).*
"U.S. Appl. No. 15/679,866, Advisory Action dated Jul. 8, 2021".
"U.S. Appl. No. 15/679,866, Advisory Action dated Jul. 20, 2020".
"U.S. Appl. No. 15/679,866, Corrected Notice of Allowability dated Nov. 26, 2021".

(Continued)

Primary Examiner — Katherine Kolosowski-Gager
(74) Attorney, Agent, or Firm — SCHWEGMAN LUNDBERG & WOESSNER, P.A.

(57) ABSTRACT

Systems and techniques for semantic graph database capture of industrial organization and market structure are described herein. Electronic market data may be obtained from an electronic data source. A set of entities and corresponding relationships may be extracted from the electronic market data. A property may be determined for each of the relationships. A market graph data structure may be generated using the set of entities. A search query may be received including an identifier of a member of the set of entities. A market graphic may be generated based on a node corresponding to the identifier and a set of edges corresponding to the node. The market graphic may be output in a computer-readable format.

20 Claims, 7 Drawing Sheets

(56) References Cited

OTHER PUBLICATIONS

"U.S. Appl. No. 15/679,866, Final Office Action dated Apr. 24, 2020".
"U.S. Appl. No. 15/679,866, Final Office Action dated Apr. 26, 2021", 12 pgs.
"U.S. Appl. No. 15/679,866, Non Final Office Action dated Oct. 1, 2020".
"U.S. Appl. No. 15/679,866, Non Final Office Action dated Oct. 18, 2019", 13 pgs.
"U.S. Appl. No. 15/679,866, Notice of Allowance dated Nov. 3, 2021".
"U.S. Appl. No. 15/679,866, Response filed Jan. 4, 2021 to Non Final Office Action dated Oct. 1, 2020", 12 pgs.
"U.S. Appl. No. 15/679,866, Response filed Jan. 17, 2020 to Non Final Office Action dated Oct. 18, 2019".
"U.S. Appl. No. 15/679,866, Response filed Jun. 24, 2020 to Final Office Action dated Apr. 24, 2020", 14 pgs.
"U.S. Appl. No. 15/679,866, Response filed Jun. 24, 2021 to Final Office Action dated Apr. 26, 2021".
"U.S. Appl. No. 15/679,866, Response filed Jul. 22, 2021 to Advisory Action dated Jul. 8, 2021", 11 pages.
Bello-Orgaz, Gema, et al., "Social big data: Recent achievements and new challenges, Information Fusion", https://www.sciencedirect.com/science/article/pii/S1566253515000780, vol. 28, pp. 45-59, (2016), 15 pgs.

* cited by examiner

| Ticker | Company Role | Industrial Sector | Industry Subsector | Output Group |
|---|---|---|---|---|
| CO1 | Manufacturer | Telecom | Communication devices | Equipment & Devices |
| CO1 | Manufacturer | Technology | Computer hardware | Equipment & Devices |
| CO1 | Manufacturer | Technology | Computer hardware | Equipment & Devices |
| CO1 | Manufacturer | Technology | Electronics | Equipment & Devices |
| CO1 | Manufacturer | Technology | Electronics | Equipment & Devices |
| CO1 | Manufacturer | Technology | Computer hardware | Equipment & Devices |
| CO1 | Manufacturer | Technology | Computer hardware | Equipment & Devices |
| CO1 | Provider | Technology | Computer software | Services |
| CO1 | Provider | Technology | Computer software | Services |
| CO1 | Provider | Technology | Computer software | Services |
| CO1 | Provider | Technology | Computer software | Services |
| CO1 | Provider | Retail & Wholesale | Electronics stores | Services |
| CO1 | Provider | Media | Music streaming | Services |
| CO1 | Provider | Media | Digital media marketplace services | Services |
| CO2 | Manufacturer | Telecom | Semiconductors | Equipment & Devices |
| CO2 | Licenser | Technology | Chip design | Services |
| CO2 | Provider | Technology | Computer software | Services |
| CO2 | Provider | Technology | Computer software | Services |
| CO2 | Provider | Technology | Computer software | Services |
| CO2 | Provider | Financial | Equity investment services | Services |

*FIG. 3A*

| Specific Output | Customer Type |
|---|---|
| cell phones, smartphones; | General |
| desktop computers, laptop computers; | General |
| tablet computers; | General |
| handheld music and video players; | General |
| TV-interface consoles; | General |
| monitors; | General |
| wireless storage devices; | General |
| operating systems; | General |
| desktop, laptop, tablet, and phone software applications; | General |
| cloud computing software applications; | Consumer |
| database management software; | General |
| retailing of electronic products; | General |
| streaming of music personalized to the listener; | Consumer |
| purchase and rental services for digital books, music, videos, and software apps; | Consumer |
| Semiconductor chips | Telecom Manufacturer |
| licensing of IP (CDMA/OFDMA); | Telecom Manufacturer |
| fleet management GPS systems, location-awareness services; | Transportation Companies |
| push-to-talk systems; | Wireless Network Operators |
| content enablement services; | General |
| private equity and venture capital financing services; | Telco and technology early-stage development |

FIG. 3B

SEMANTIC GRAPH DATABASE CAPTURE OF INDUSTRIAL ORGANIZATION AND MARKET STRUCTURE

CROSS-REFERENCE TO RELATED APPLICATION

This application is a continuation of U.S. patent application Ser. No. 15/679,866, filed Aug. 17, 2017, which is incorporated by reference herein in its entirety.

TECHNICAL FIELD

Embodiments described herein generally relate to graph data structures and, in some embodiments, more specifically to a market graph data structure.

BACKGROUND

Market data may include descriptive data about a company and an industry in which the company may operate. The market data may include a company name, a stock ticker symbol of the company, an industrial sector of the company, and an industrial subsector in which the company participates. Market data may be arranged in a data structure (e.g., tables, etc.). The market data structure may be used in analyzing market activity of the company.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A and 3B illustrate an example of a market graphic that may be generated using a semantic graph database capture of industrial organization and market structure, according to various embodiments.

DETAILED DESCRIPTION

Figure 1:
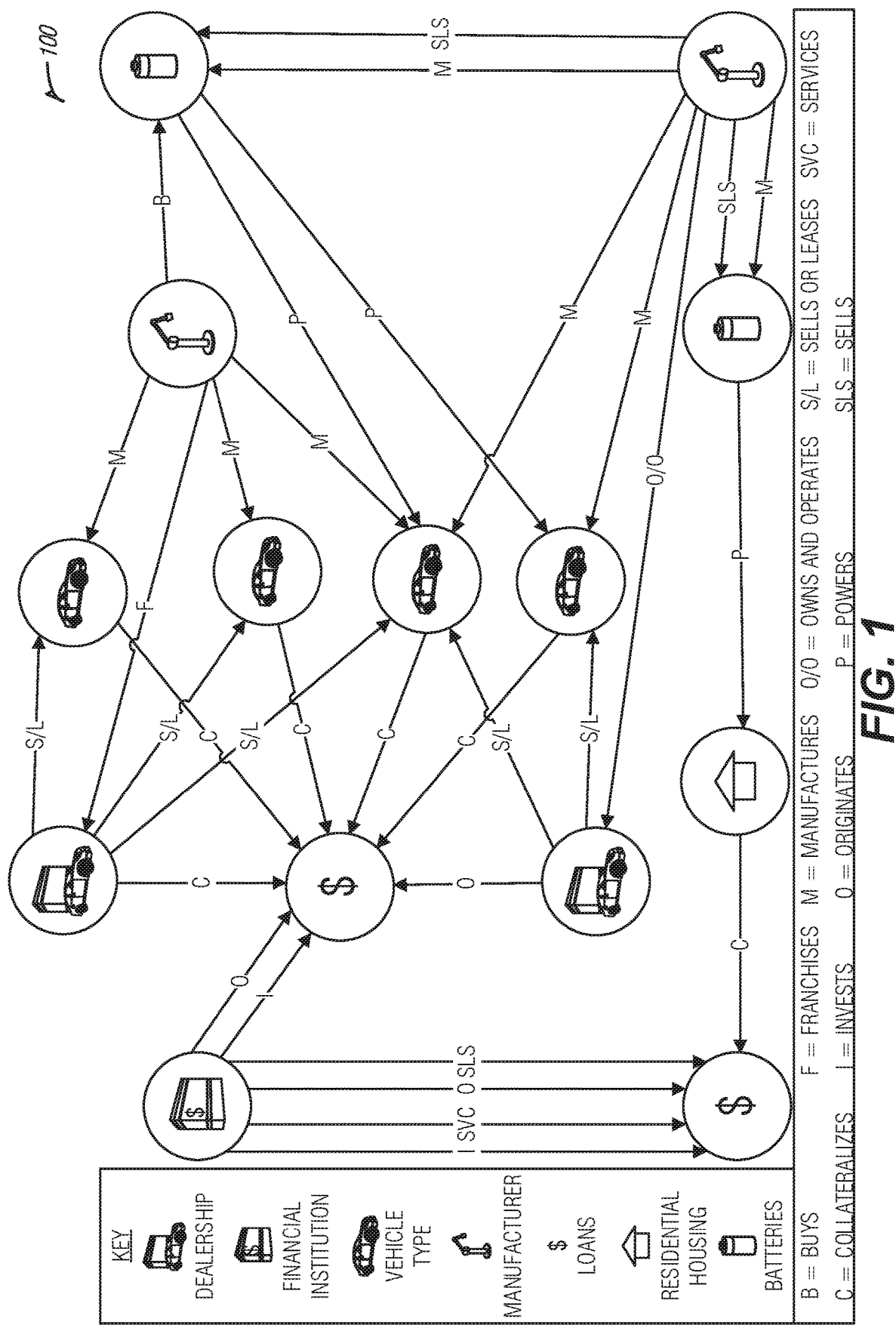
FIG. 1 illustrates an example of a market graph that may be represented in a semantic graph database capture of industrial organization and market structure, according to various embodiments.

Traditional market data structures stored on computing devices may include information about companies and the markets in which they operate. For example, a table in a market database may include a name of a company, the stock ticker symbol of the company, an industrial sector of the company (e.g., consumer goods, technology, etc.), and an industrial subsector of the company (e.g., electronic equipment, internet service provider, communication equipment, etc.), Traditional market data structures may be used to analyze a dimensional aspect of a company. For example, traditional market data structures may be used to identify that company A and company B are competitors based on both companies having an industrial sector of consumer goods and an industrial subsector of electronic equipment. However, traditional market data structures may rely on field similarities between records in the traditional market data structure to identify relationships (e.g., competitors, etc.) between companies. Thus, it may be difficult to establish more complex relationships (e.g., supplier/customer, etc.) using the limited logical structure of a traditional stored market data structure.

The subject matter discussed herein provides a market graph data structure that includes market graphs representing relationships between companies. The market graph data structure may be used in conjunction with traditional market data structures to identify relationships among companies. The market graph data structure may learn relationships by analyzing a variety of data sources and by performing self-referential analysis of its graph information to establish additional relationships. Thus, the market graph data structure may be dynamic and self-generating which may provide complex datasets that may be used to perform deep analysis of intercompany relationships in the market.

The techniques discussed herein may describe how economic concepts in the theory of industrial organization may be represented as a market graph data structure (e.g., a graph database, etc.), The market graph data structure may be implemented to measure a degree of market competition, portfolio management, etc. Let $C=\{c_1, \ldots, c_j, \ldots c_j\}$ be the set of all companies indexed by j. Let $X=\{x_1, \ldots, x_i, \ldots x_N\}$ be the set of all products or services indexed by i. For simplicity, all services may be treated as products and the word services may be dropped. Any product may be manufactured, grown, extracted, provided and so forth. For simplicity, all such actions may be referred to as "produced." The market graph data structure may include nodes, relationships, properties, labels, etc. Each $c_j$ and $x_i$ are instances of graph nodes. Graph labels group similar nodes. "Company" is a graph label for any node $c_j$ and "Product" is a graph label for any node $x_i$. The graph relationship c>PRODUCE⇒x means that company c produces product x. Relationship tense may be present plural for brevity and to avoid unneeded distinctions.

An example of a more advanced graph relationship may be c>=USE⇒$x_i$>=PRODUCE⇒x meaning that c uses product $x_i$ to produce x. Other graph relationships may include buy and sell such as $x_i$⇐BUY=<c>=SELL⇒x. Both nodes and relationships may have graph properties that may represent variable names and their corresponding values, known as key:value pairs. For example, company node properties may be "firm_name: Company A, Inc." and "ticker: acorn".

Products may be sold to consumers or households as "retail," to other firms or other divisions within the same firm as "wholesale," or both. Thus, graph transaction relationships may have a distribution_channel property such as, for example, "distribution_channel: retail," "distribution_channel: wholesale," or "distribution_channel: both," etc. Graph transaction relationships may also have a site property such as, for example, "transaction_site: store," "transaction_site: web," "transaction_site: plant," etc. Such paths may also have a distribution method property such as, for example, "distribution_method: pick-up," "distribution_method: delivery," etc. The graph transaction relationships may also have a distribution type property such as, for example, "distribution_type: digital," "distribution_type: ground delivery," "distribution_type: rail," etc.

A number of relationships may be established by the market graph data structure based on internal analysis of company relationships. The market graph data structure may endogenously define company $c_j$ as a competitor of company c if for some product x, $c{>}{=}PRODUCE{\Rightarrow}x{\Leftarrow}PRODUCE{=}{<}c_j$. That is to say, if the two companies have produce relationships to the same product, a competitor relationship may be established. The market graph data structure my endogenously define company c j as a customer of company c if for some product x, $c{>}{=}PRODUCE{\Rightarrow}x{\Leftarrow}BUY{=}{<}c_j$. That is to say, if one company buys what the other company produces, a customer relationship may be established. In some cases, the output of one company may be an input used to produce the output of another company. Thus, a supply chain may be established. In such a case, the market graph data structure may define c as a supplier to $c_j$. The market graph data structure may endogenously define company $c_j$ as a distributor of company c if for some product x, $c{>}{=}PRODUCE{\Rightarrow}x{\Leftarrow}SELL{=}{<}c_j$. That is to say, if one company sells what the other company produces, a distributor relationship may be established. In some cases, a distributor may buy at wholesale and may sell at retail. In addition, commission contracts may be represented by the market graph data structure. The market graph data structure may endogenously define company $c_j$ as a subsidiary of company c if $c{>}{=}OWN{\Rightarrow}c_j$. That is to say, if a company owns another company, a subsidiary relationship may be established.

A given product might have irrelevant small feature distinctions compared to another product. In that case, the product may be defined as a class such as, for example, toothpaste, instead of a brand of toothpaste. The market graph data structure may be variously configured to provide, by way of example and not limitation, additional granularity, additional grouping, etc. as particular uses dictate. The market graph data structure may include additional detail information. For example, the data structure may include structural elements for representing, for example, geographically distinct stores used to sell products of a company. Details of production methods, sales and marketing methods, etc. may also be included in the market graph data structure.

In effect, a business model of a company may be defined as a subset of the market graph data structure that connects to the company node via a path of nodes and relationships of various depths. To view the business model, a graph query may be performed on the market graph data structure. For industry analysis, each product node may be assigned a corresponding code (e.g., a six-digit standard industrial classification (SIC) code, etc.) as a graph property. In the market graph data structure, a definition of a market may be a set of nodes and relationships in which a specific product is produced, distributed, transacted (e.g., bought and sold), delivered, etc. For example, the relationships described above (e.g., competitor, customer, supplier, distributor, subsidiary, etc.) may be components of a market. Unions of markets may define bigger markets. In short, the core insight is that the industrial organization concepts map directly to market graph data structure constructs. Combining industrial organizational theory with the market graph data structure may enable the identification and representation of superior business models indicated by, for example, unique products of a company with few competitors, scale and scope effects in production of a company, network effects in marketing and distribution of a company, etc. For example, the market graph data structure may be used in portfolio management to filter and select equities based on comparatively superior business models to their peers.

While the examples provided may generally describe product-related relationships, it may be readily understood that the market data structure may be configured to accommodate a variety of relationships between market participants such as, by way of example and not limitation, contractual relationships, financial relationships, service-related relationships, standards body relationships, regulatory relationships, governmental relationships, etc.

FIG. 1 illustrates an example of a market graph 100 that may be represented in a semantic graph database capture of industrial organization and market structure, according to various embodiments. The market graph 100 may include a variety of nodes representing entities such as, for example, auto dealerships, financial institutions, vehicle types, manufacturers, loan products, residential housing services, batteries, etc. Each of the entities may represent an organization (e.g., company, financial institution, manufacturer, etc.), a product/service (e.g., battery, loan, vehicle, residential housing service, etc.).

Relationships between the entities may be direct or indirect. For example, an auto manufacturer may manufacture sedans (e.g., a vehicle type) and a direct relationship of manufacturer manufactures sedans may be established. In another example, an auto dealership may sell/lease sedans and an indirect relationship between the auto dealer and the manufacturer may be established based on the manufacturer manufacturing sedans and the auto dealer selling/leasing sedans. In an example, such a relationship may be established as a supplier relationship because the output of the manufacturer (e.g., sedans) may be used in the output of the auto dealership (e.g., sedans for sale; lease.

A market graph data structure may be generated based on the nodes and corresponding relationships. The market graph data structure may include the nodes of the market graph and the relationships may form edges in the market graph data structure. The nodes may correspond to entities (e.g., organizations, products, services, etc.). Nodes may include properties such as, for example, key-value pairs. The nodes may include labels (e.g., an identifier of an entity, an industry, an entity type, etc.). The edges may include properties such as, by way of example and not limitation, names/types such as: buys, collateralizes, franchises, invests, manufactures, originates, owns and operates, powers, sells or leases, sells, services, etc. Like nodes, the edges may also include properties, such as "plant location: Gary, Indiana." The edges of the market graph data structure may define direct and indirect relationships between nodes in the market graph database.

The market graph data structure may be generated based on data obtained from a number of sources (e.g., newsfeeds, industry databases, market databases, industry journals, etc.). In an example, a web crawler may locate (e.g., based on keyword matching, semantic matching, etc.) internet based sources containing information that may include entity-relationship information. A data scraper may collect textual data from the sources. The text may be processed using a natural language processor to parse, segment, tag, summarize, and otherwise transform the text into a format for further processing.

The output from the natural language processor may be used as input by a machine learning processor that may use machine learning techniques (e.g., regression, clustering, classifiers, etc.) to identify entity-relationship information in the output from the natural language processor. For example, the machine learning processor may receive a journal article about a supplier of cellular telephone semiconductors that may mention a cellular telephone manufacturer. Further, the machine learning processor may identify a supplier relationship between the supplier and the manufacturer based on training data indicating that a supplier of a component of a product mentioned in a journal article with a manufacturer of the product indicates a supplier relationship. The entities and relationships may be extracted from the processed data as output.

The output from the natural language processor and the machine learning processor may include the extracted data including a set of entities and corresponding relationships. The output may be to generate an initial market graph data structure with the entities identified in the output as the nodes, and the relationships identified as edges. The output may also include a variety of properties for the entities and relationship such as, for example, a market segment of an entity, a relationship type of a relationship, etc. The properties may be added to their respective nodes and relationships to provide additional context for the nodes and relationships that may be used to identify additional relationships within the market graph data structure.

A graphical user interface may be generated for display (e.g., via a webpage, stand-alone application, mobile application, etc.) on a display device (e.g., a screen of a computer, smartphone, tablet, etc.). The graphical user interface may include a variety of user interface elements (e.g., buttons, text, textboxes, dropdown boxes, etc.) for receiving input from a user. The received input may be a query for data contained in the market graph data structure. The query may include an identifier (or multiple identifiers) for a node of the market graph data structure and may include an indication of relationships of interest. Upon receiving the query, the nodes and edges of the market graph data structure and their corresponding properties may be evaluated to identify paths between the identified node and other nodes of the market graph data structure. A particular subset of the market graph data structure may be assembled to create a market graphic based on direct and indirect paths between nodes in the market graph data structure. Newly discovered direct or indirect paths may be added as properties of the corresponding nodes (e.g., as a key-value pair, etc.) to increase speed and efficiency of future queries. Thus, the market data structure may continue to develop additional edges while the market data structure is in operation.

The market graphic may be presented in several forms via machine readable output, By way of example and not limitation, the market graphic may be a spreadsheet, database, chart, table, figure, a data input file formatted for use by another application (e.g., a data analytics application, etc.), etc. In an example, a distributable market graph data structure may be output. The distributable market graph data structure may include a subset of the market graph data structure (e.g., a portion of the market graph data structure corresponding to the submitted query, etc.) include a subset of the market graph data structure.

In an example, the market graph data structure and a structured relational database (e.g., SQL data base, etc.) may be evaluated using the query to extract data relevant to the query terms. The information retrieved from the structured relational database may be used to enhance the evaluation of the market graph database. For example, entities and properties may be extracted from the structured database and may be added to the search query when evaluating the market graph database. In an example, elements retrieved from the structured database evaluation may be added to the market graph database. For example, labels associated with an entity may be retrieved from the structured database and may be added as properties of a node corresponding with the entity in the market graph database. The properties may be used to identify additional relationships based on edges formed by the additional properties. In another example, the market graphic may include intersecting data returned from the evaluation of the structured database and the market graph data structure. In an example, the market graph data structure may contain links (e.g., key-value pairs, etc.) to external data tables. For example, a stock ticker symbol may be a property of a node of the market graph data structure and may link to a financial table including financial data for an organization corresponding to the node. Thus, the market graph data structure may include references to external information that may be accessed automatically when evaluating nodes and relationships in the market graph data structure.

The graphical user interface may display the market graphic and may provide user interface elements allowing the user to export the market graphic to another application such as, for example, an analytics software application, Thus, the user is provided with a robust market graphic based on learned data that expands and becomes more refined through use over time.

In an example, a news story may suggest good news about solar stocks. A user may query the market graph data structure using the term solar which may generate a market graphic for an industry subsector solar energy. Heat maps of the daily price changes of manufactures of solar energy devices, suppliers to the manufactures of solar energy devices, and the distributers of solar energy devices may be created and stacked. For any organization included in the market graphic that has notable price or volume changes (e.g., above an absolute or relative changes) a variety of output may be generated. For example, a market graphic spreadsheet may be created including the firms in the group, secondary or tertiary connections may be assessed to determine if any connection is particularly related to the news story, one-year time series of prices may be charted for the remaining stocks of interest, or the usual statistics about price and earnings, earnings growth, etc. may be displayed. Stock trades may be completed in view of the analysis of the market graph data structure for solar stocks.

The market graph data structure may implemented as a cloud based computing service with a website providing data and analytics based on the market graph data structure. The market graph data structure may have a variety of uses including, by way of example and not limitation, stock market analysis and research, real-time trading support, portfolio management, directory information about products, services, and business models, supply chain analysis, analysis of market structure and product markets, business evaluation, competitive and counterparty analysis, etc.

In an example, quantitative hedge funds may use machine learning to predict changes in stock prices based on large quantities of data and may apply trading rules based on the predictions. Tens of billions of dollars may be made or lost every year based on the strategies of quantitative hedge funds. The market graph data structure may potentially add a critically valuable layer of interpretable information to the otherwise robotic, and at times incomprehensible, trading rules. In other words, this framework might increase the efficiency and accuracy of market prediction. For example, no single person may know every step in the production of a 3D printer. However, querying the market graph of 3D printers may depict the ecosystem quite instructively. For example, a mobile application may allow a user to point a cell phone camera at an object and a market graphic based on the market graph data structure of the product, such as a 3D printer, may be returned using the present techniques. If every organization and product/service in the world were included in the market graph data structure, it may provide an operational model of the world's production economy.

Figure 2:
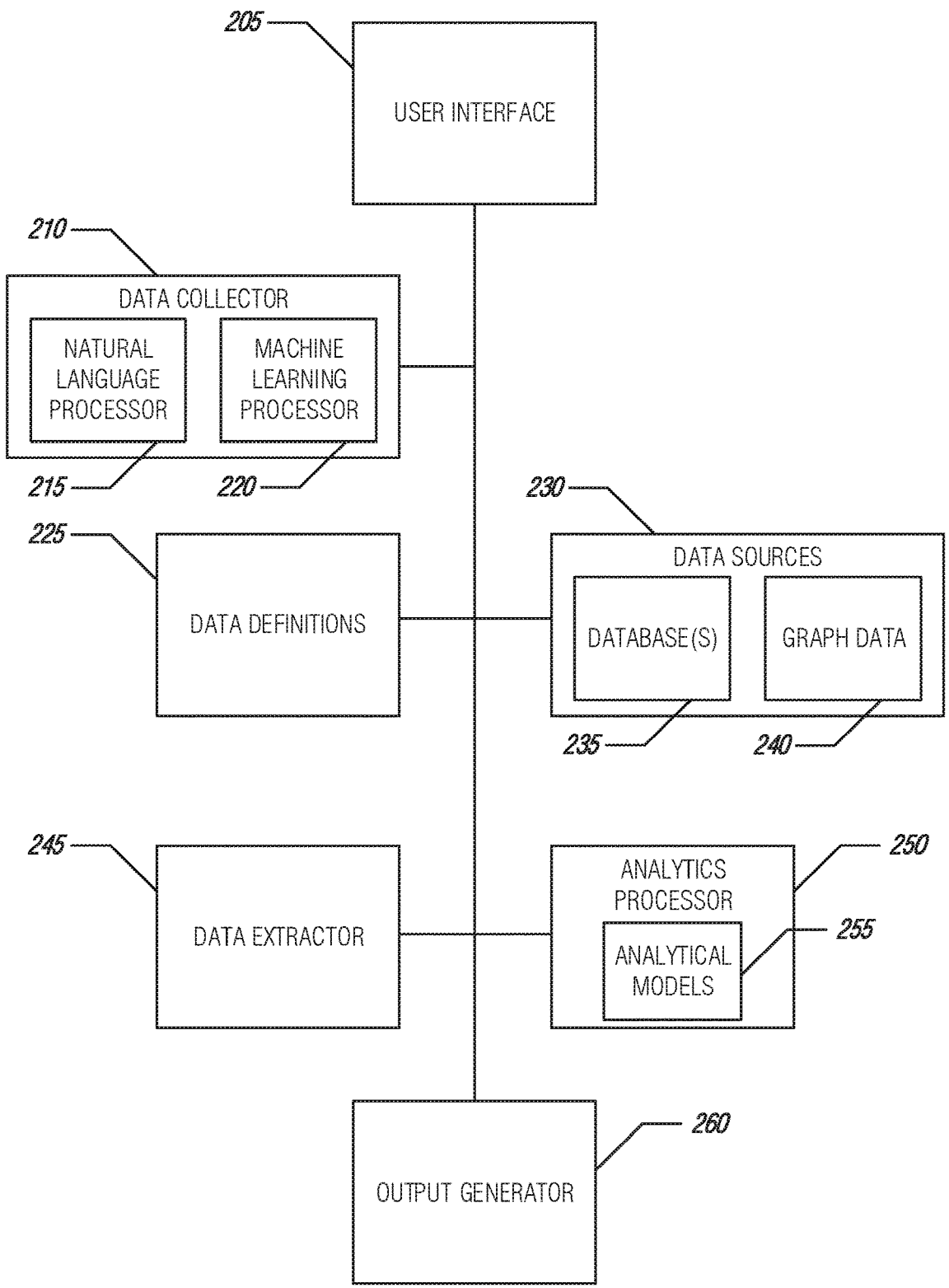
FIG. 2 illustrates an example of a system for implementing a semantic graph database capture of industrial organization and market structure, according to various embodiments.

FIG. 2 illustrates an example of a system 200 for implementing a semantic graph database capture of industrial organization and market structure, according to various embodiments. The system 200 may provide features as described in FIG. 1. The system 200 may include a user interface 205, a data collector 210, data definitions 225, data sources 230, a data extractor 245, an analytics processor 250, analytical models 255, and an output generator 260. The data collector 210 may include a natural language processor 215 and a machine learning processor 220. The data sources 230 may include database(s) 235 and graph data 240.

The data collector 210 may obtain electronic market data from an electronic data source (e.g., newsfeeds, internet posts, electronic journals, internet accessible databases, company business descriptions, synthesized data, company prospectuses, quarterly financial reports, annual reports, etc.). The data collector 210 may extract a set of entities and corresponding relationships from the electronic market data. The relationships may define a connection between a first entity and a second entity of the set of entities.

The machine learning processor 220 may extract the set of entities and corresponding relationships using machine learning techniques by identifying, for example based on training data, an entity and a relationship of the entity. In an example, an electronic data repository of the electronic data source may be accessed and the electronic data repository may be analyzed through use of machine learning to identify data that indicates an entity relationship. The electronic market data may include the data that indicates the entity relationship. For example, an electronic journal article may include text describing products manufactured by a manufacturer and describing how another manufacturer uses the products. The machine learning processor 220 may identify a supplier relationship between the manufacturer and the other manufacturer.

The electronic market data may be processed by the natural language processor 215 to transform data collected into a format consumable for machine processing. For example, text included in the electronic market data may be parsed, segmented, sorted, and indexed. In an example, the electronic data repository may be evaluated through use of the natural language processor 215. The natural language processor 215 may use a set of industry-specific semantic libraries to evaluate the electronic data repository. Term usage may differ from industry to industry so the natural language processor 215 may select a semantic library based on the type of data expected to be contained in a data source. For example, the natural language processor 215 may select an aviation specific semantic library when processing data contained in an aircraft manufacturing journal. The industry specific semantic libraries may be refined as data is evaluated (e.g., using machine learning processor 220, etc.). For example, synonyms, new terms, etc., may be learned as data is evaluated which may be used to modify an industry specific semantic library being used in the evaluation. Thus, future evaluations may produce more refined and reliable results.

The data collector 210 may determine a property for each of the relationships. The property may provide information about the relationship. In an example, the property may describe a relationship type between a first entity of the set of entities and a second entity of the set of entities. For example, a property (e.g., name/type, etc.) for a relationship between a manufacturer and a product may be identified as "manufactures." The property may provide context to the relationships that may be used to identify additional entity relationships. For example, the "manufactures" property for the relationship between the manufacturer and the product may be used to identify a supplier relationship between the manufacturer and another manufacture having a relationship between it and the product with a property of "purchases." Thus, the properties may be used in identifying indirect relationships between entities.

The data collector 210 may generate the data sources 230 using the data extracted from the electronic market data. The database(s) 235 may include tables of data collected including lists of entities and corresponding properties. The graph data 240 may include a market graph data structure generated based on the set of entities and their corresponding relationships. The market graph data structure may include nodes representing entities (e.g., products, services, organizations, etc.) and relationships between the entities. The market graph data structure may be generated using the set of entities, relationships, and respective properties for each of the relationships. The market graph data structure may include a node corresponding to each member of the set of entities and an edge corresponding to each of the relationships.

The data collector 210 may maintain data definitions 225 that may include data types and locations of various data elements of the data included in the data sources 230. The data definitions 225 may include identities of the data sources 230, data scope (e.g., dates, limitations, etc.), and a data dictionary including variable names, variable definitions, allowable values, etc. The data definitions 225 may be referenced when a request for data (e.g., a query, etc.) is received.

The user interface 205 may include a variety of user interface elements to provide data to a user and receive user input. The user interface 205 may receive a search query that includes an identifier of a member of the set of entities. In an example, a query graphical user interface may be generated. The query graphical user interface may include an interactive query submission user interface element. In an example, the identifier of the member of the set of entities may be received via the query graphical user interface. For example, a user may enter the ticker symbol of a company into search query text box and may click a submit button to initiate the query.

The received query may be provided to the data extractor 245. The data extractor 245 may access the market graph data structure (and other data elements of the data sources 230) to generate a market graphic based on a node that corresponds to the identifier and a set of edges that correspond to the node. The market graphic may depict market relationships between an entity that corresponds to the node and other entities that correspond with other nodes through use of the property that corresponds to each member of the set of edges. In an example, the market graphic may be generated in response to detection of interaction with the interactive query submission user interface element.

The output generator 260 may generate output of the market graphic in a computer-readable format. In an example, a graphical representation (e.g., a support vector graphic, etc.) of the market graphic may be generated and displayed on the user interface 205. In an example, the output generator 260 may generate a distributable market graph data structure through use of the market graphic. The distributable market graph data structure may include a subset of nodes and edges of the market graph data structure. The distributable market graph data structure may be transmitted to a client computing device. In an example, the distributable market graph data structure may be displayed via the user interface 205 (e.g., as a link, etc.) providing a user with an ability to download the results to a file storage location on the client computing device.

In an example, the distributable market graph data structure may be transmitted to the analytics processor 250. The analytics processor 250 may generate analytical information based on the distributable market graph data structure. The analytics processor 250 may use a variety of analytical models 255 such as, for example, regression analysis, machine learning classification or prediction, portfolio analysis, stock selection, trading rules, general research, etc. in generating analytical information. The analytical models 255 may include rules for processing nodes and edges to select entities based on relationships identified based on various relationship properties. For example, a stock selection model may identify a cellular telephone manufacturer with a supplier relationship with a chip manufacturer that has increased production as a candidate for addition to a stock purchase. The analytics processor 250 may work in conjunction with the output generator 250 to generate output of the analytics information. In an example, the output generator 260 may generate output for display via the user interface 205. For example, text, tables, charts, figures, etc, may be displayed via the user interface 205. In an example, the analytics processor 250 may include machine learning features.

The data extractor 245 may work in conjunction with the data collector 210 to update the market graph data structure based on the market graphic. Thus, the market graph data structure may be automatically modified to provide more robust and efficient subsequent evaluations. In an example, the market graph data structure may be analyzed to identify a relationship path between a first node of the market graph data structure and a second node of the market graph data structure. The relationship path may include a plurality of edges. The market graph data structure may be modified by storing the relationship path as a data element of the first node and the second node. For example, a supplier relationship may be identified between a cellular phone manufacturer and a semiconductor manufacturer and a key-value pair property may be added to their respective nodes indicating the supplier relationship.

In an example, an intermediate path may be identified between the first entity and the second entity. The intermediate path may represent a relationship between the first entity and a third entity between the first entity and the second entity. The market graph data structure may be modified by storage of the intermediate path as a data element of the first node and the third node. In an example, the intermediate path may be stored in the second node. For example, the supplier relationship between the cellular phone manufacturer and the semiconductor manufacturer may pass thorough a cellular phone product node. For example, the cellular phone manufacture may have manufacturer relationship with the cellular phone product entity (e.g., as determined by a shared edge, etc.) and there may be a supplier of cellular telephone semiconductors relationship between the cellular phone product entity and the semiconductor manufacturer (e.g., as determined by a shared edge, etc.). A key-value pair property may be added to one or more of the nodes corresponding with the entities to reduce future path processing.

Figure 6:
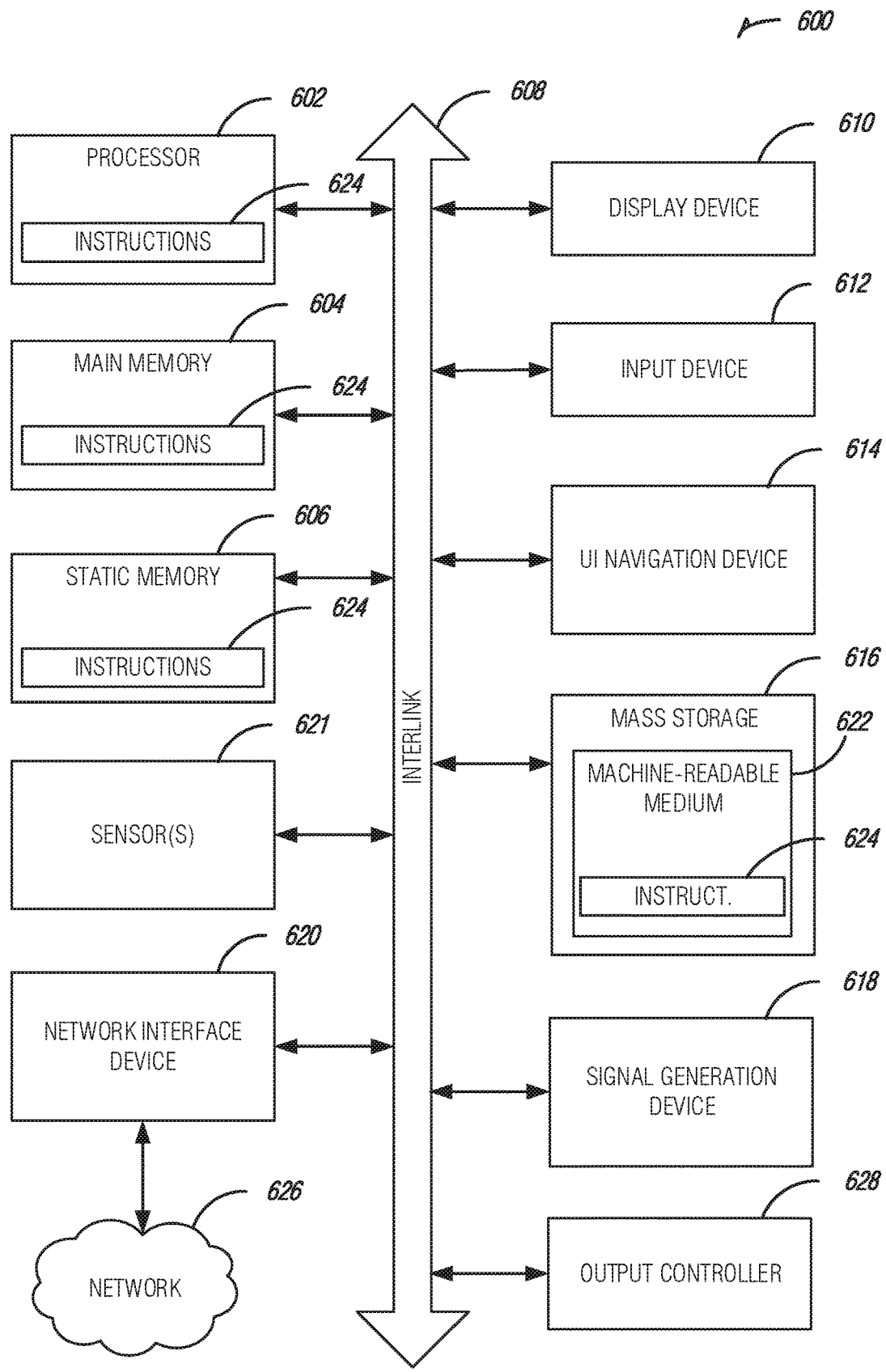
FIG. 6 is a block diagram illustrating an example of a machine upon which one or more embodiments may be implemented.

The user interface 205, data collector 210, the natural language processor 215, the machine learning processor 220, the data extractor 245, the analytics processor 250, and the output generator 260 may comprise one or more processors (e.g., hardware processor 602 described in FIG. 6, etc.) that execute software instructions, such as those used to define a software or computer program, stored in a computer-readable storage medium such as a memory device (e.g., a main memory 604 and a static memory 606 as described in FIG. 6, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the user interface 205, data collector 210, the natural language processor 215, the machine learning processor 220, the data extractor 245, the analytics processor 250, and the output generator 260 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

FIGS. 3A and 3B illustrate an example of a market graphic 300 that may be generated using a semantic graph database capture of industrial organization and market structure, according to various embodiments. The market graphic 300 may be generated by evaluating nodes and edges of a market graph data structure (e.g., by the data extractor 245 as described in FIG. 2). The market graphic 300 may include a stock ticker symbol for an organization, a role of the organization (e.g., a relationship to the output, etc.), an industry sector, an industry subsector, an output group (e.g., type of output, etc.), a specific output (e.g., a product, service, etc. that is output by the organization, etc.), and a customer type (e.g., the types of organizations to which the output is directed, etc.). The example market graphic 300 may depict relationships between an entities (e.g., between an organization entity and an output entity, etc.) as well as information that may be used to identify additional relationships (e.g., a customer type indicating entity classes that may consume the products and services, etc.).

While the example depicts the market graphic 300 as a table, the market graphic 300 may be output in a variety of forms such as, for example, text, charts, figures, an analytics application data file, a database, a distributable market graph data structure, etc. The market graphic 300 may be displayed via a graphical user interface (e.g., user interface 205 as described in FIG. 2, etc.) or provided as a data file. The market graphic 300 may be provided in a format that may be used by an analytics processor (analytics processor 250 as described in FIG. 2, etc.) to generate analytical information (e.g., comparative analysis, etc.

Figure 4:
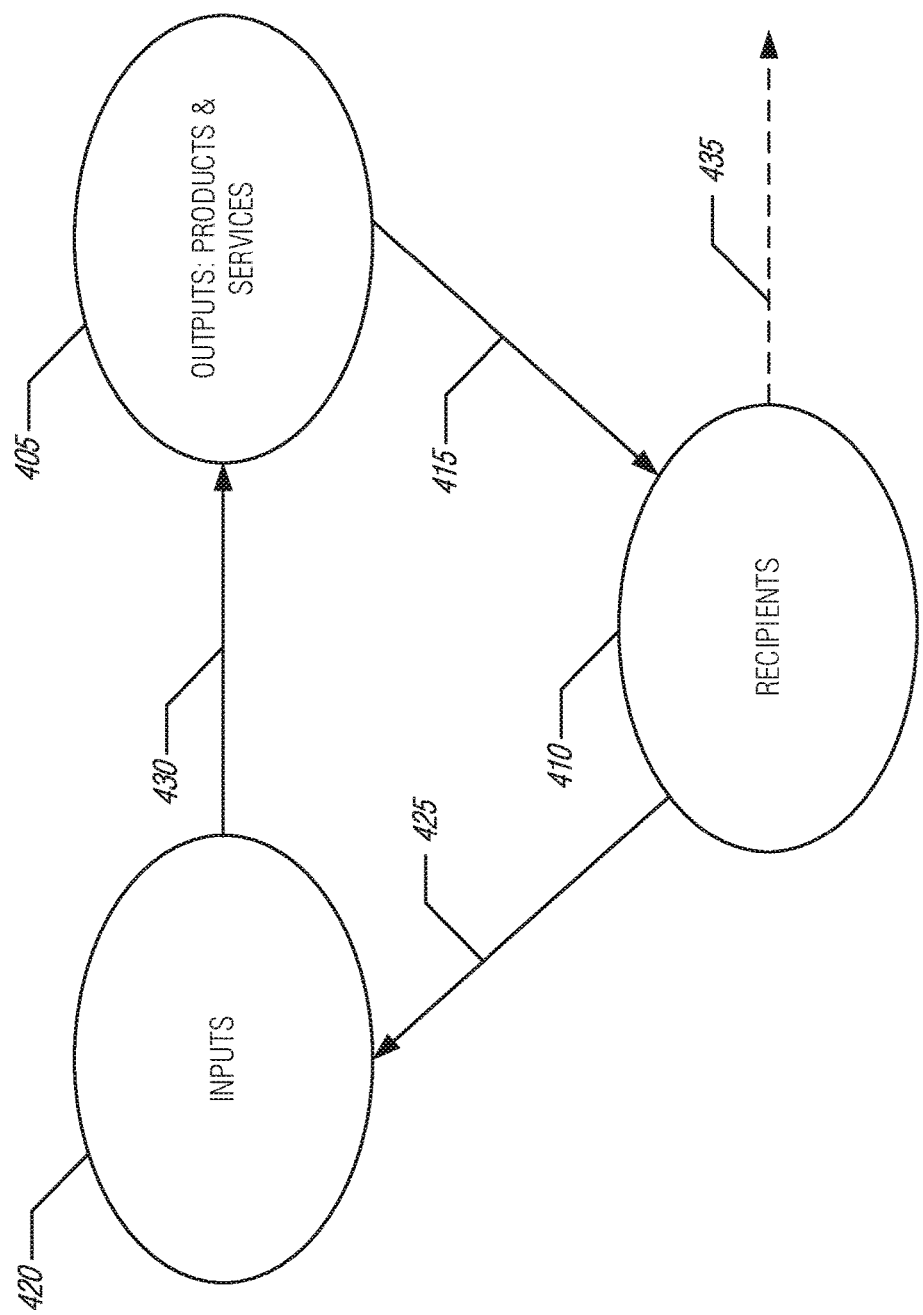
FIG. 4 illustrates an example of input and output relationships in a semantic graph database capture of industrial organization and market structure, according to various embodiments.

FIG. 4 illustrates an example of input and output relationships 400 in a semantic graph database capture of industrial organization and market structure, according to various embodiments. The input and output relationships may include outputs of products and services 405. The outputs may include products and services provided by an organization. Each organization, product, and service may be an entity represented by a node in a market graph data structure. For example, a cellular phone manufacturer and a cellular phone product manufactured by the cellular phone manufacturer may be entities in the market graph data structure.

The input and output relationships 400 may include recipients 410 that use the products and services output by the organization providing the output. The recipients may be represented by nodes in the market data structure and the output-recipient relationships 415 between the outputs of products and services 405 and the recipients 410 may be represented in the market data structure by edges. The edges may include properties such as, for example, distribution methods, sales costs, marketing costs, delivery costs, etc. Information regarding purchase costs of the recipients 410 may be used to determine revenue of organizations providing outputs of products and services 405.

The output-recipient relationships 415 may indicate that a recipient 410 is an end-user of an output 405 and a consumer relationship 435 may be identified between a recipient of the recipients 410 and an output of the outputs of products and services 405. The recipients 410 may use the received outputs of products and services 405 as inputs 420 in producing outputs of goods and services 405. A supplier relationship 435 may be identified where an output is reused as an input by a recipient. A manufacturer and/or provider relationship 430 may be identified by properties such as transformation technology, processes, contractual methods, etc. indicating that the inputs are used to produce output. The manufacturer and/or provider relationship 430 may include properties such as, for example, operating costs, production costs, etc.

The information obtained from the input and output relationships 400 may be used to generate the market graph data structure to include nodes for each entity and edges for each relationship with each node and edge being assigned properties based on corresponding information identified in evaluating the input and output relationships 400. The nodes, relationships, and properties may be used in evaluating entities to generate a market graphic (e.g., market graphic 300 as described in FIGS. 3A and 3B, etc.) that depicts relationships between entities. The properties may be evaluated to determine wide-ranging economic data for an entity including cost of production, supply chain contingencies, etc.

Figure 5:
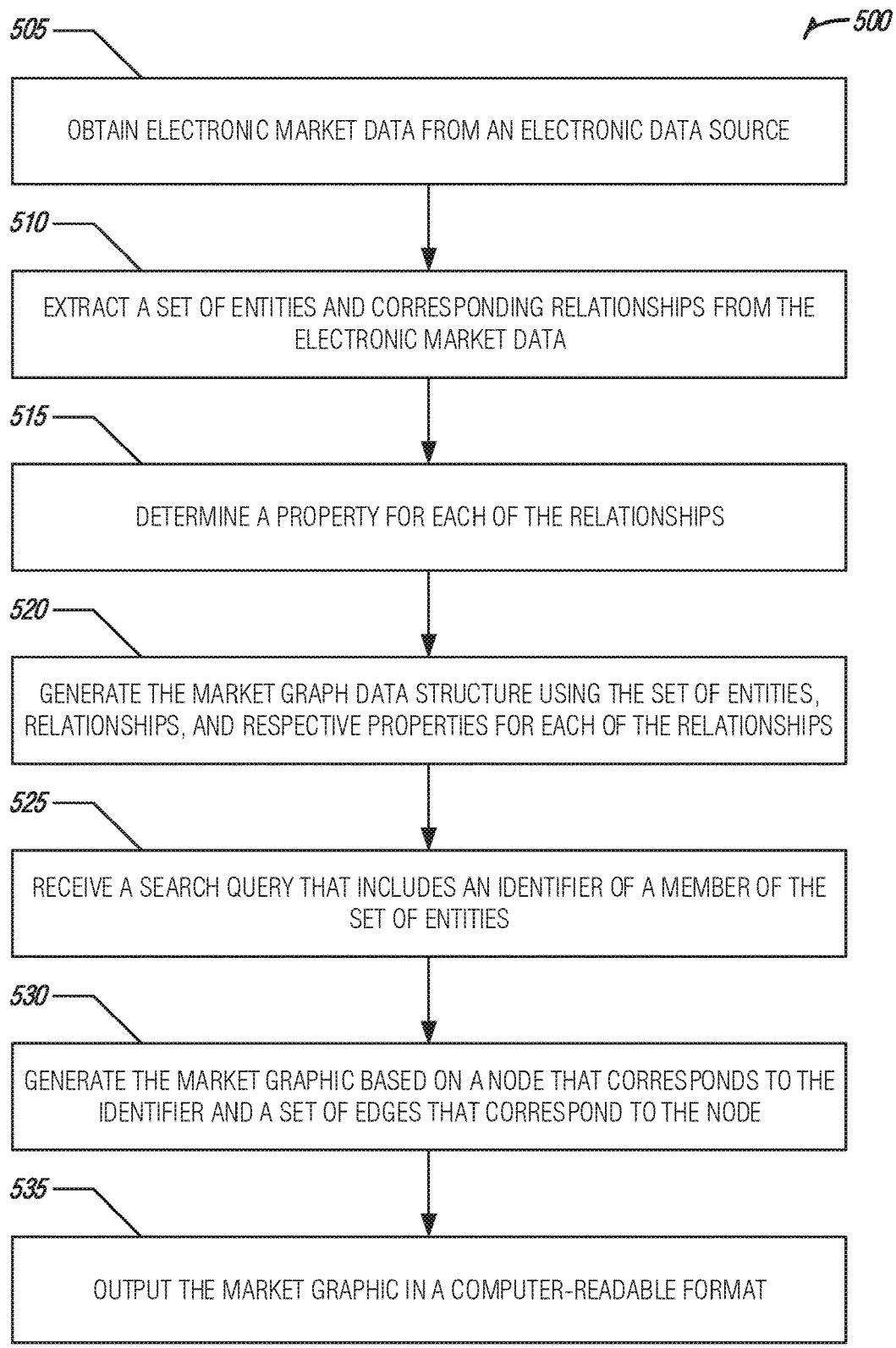
FIG. 5 illustrates an example of a method for implementing a semantic graph database capture of industrial organization and market structure, according to various embodiments.

FIG. 5 illustrates an example of a method 500 for implementing a semantic graph database capture of industrial organization and market structure, according to various embodiments. The method 500 may provide features as described in FIGS. 2-4.

Electronic market data may be obtained (e.g., by the data collector 210 as described in FIG. 2) from an electronic data source (e.g., at operation 505). In an example, an electronic data repository of the electronic data source may be accessed and the electronic data repository may be analyzed using machine learning to identify data that indicates an entity relationship. The electronic market data may include the data that indicates the entity relationship. In an example, the electronic data repository may be evaluated using a natural language processor. In an example, the set of industry-specific semantic libraries may be used to evaluate the electronic data repository.

A set of entities and corresponding relationships may be extracted from the electronic market data (e.g., at operation 510). The relationships may define a connection between a first entity and a second entity of the set of entities. A property may be determined for each of the relationships (e.g., at operation 515). In an example, the property may describe a relationship type between a first entity of the set of entities and a second entity of the set of entities.

A market graph data structure may be generated using the set of entities, relationships, and respective properties for each of the relationships (e.g., at operation 520). The market graph data structure may include a plurality of nodes. Each node may correspond to a different entity of the set of entities. The market graph data structure may include a plurality of edges that correspond to the relationships. A search query may be received that includes an identifier of a member of the set of entities (e.g., at operation 525). In an example, a query graphical user interface may be generated for display on a display device. The query graphical user interface may include an interactive query submission user interface element. The identifier of the member of the set of entities may be received via the query graphical user interface.

A market graphic may be generated based on a node that corresponds to the identifier and a set of edges that correspond to the node (e.g., at operation 530). The market graphic may depict market relationships between an entity that corresponds to the node and other entities that correspond with other nodes through use of the property that corresponds to each member of the set of edges. In an example, the market graphic may be generated in response to detection of interaction with the interactive query submission user interface element. The market graphic may be output in a computer-readable format. In an example, a graphical representation of the market graphic may be generated for display on a display device and the graphical representation of the market graphic may be displayed via a graphical user interface (e.g., the user interface 205 as described in FIG. 2, etc.).

In another example, a distributable market graph data structure through use of the market graphic may be generated. The distributable market graph data structure may include a subset of nodes and edges of the market graph data structure and may be transmitted to a client computing device. In some examples, the market graph data structure may be modified during use. In an example, the market graph data structure may be analyzed to identify a relationship path between a first node of the market graph data structure and a second node of the market graph data structure. The relationship path may include a plurality of edges and the market graph data structure may be modified thorough storage of the relationship path as a data element of the first node and the second node. In an example, an intermediate path may be identified between the first entity and the second entity. The intermediate path may represent a relationship between the first entity and a third entity between the first entity and the second entity and the market graph data structure may be modified through storage of the intermediate path as a data element of the first node and the third node.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UT) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IFEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for generating a market graphic using a market graph data structure, the system comprising:
   at least one processor; and
   memory including instructions that, when executed by the at least one processor, cause the at least one processor to perform operations to:
   provide a first user interface having an interactive query submission user interface element;
   receive a query that includes an identifier at the interactive query submission user interface element;
   in response to receiving the query at the interactive query submission user interface element, evaluate a relational database using the query to extract a set of entities and corresponding relationships from electronic market data, wherein the relationships define a connection between a first entity and a second entity of the set of entities;
   determine a property for each of the relationships;
   generate the market graph data structure using the set of entities, relationships, and respective properties for each of the relationships such that the market graph data structure includes links;
   analyze the market graph data structure to identify a relationship path between a first node of the market graph data structure and a second node of the market graph data structure, wherein the relationship path includes a plurality of edges, at least one other node, and the first node and the second node are connected by the at least one other node and are not directly connected by an edge, the first node relating to first subject matter, the second node relating to second subject matter, and the at least one other node relating to at least one other subject matter, the at least one other node defining a relationship between the first node and the second node that includes an intermediate path defined by a first path between the first node and the at least one other node and a second path between the at least one other node and the second node;
   add key-value pairs that link to external databases associated with the first node, the second node, and the at Least one other node via the market graph data structure links, the external databases including external information related to the first subject matter, the second subject matter, and the at least one other subject matter where the market graph data structure includes the key-value pairs and the key-value pairs provide the market graph data links to the external databases such that the market graph structure references the external information at the external database;
   automatically access the external databases via the market graph data links provided by the key-value pairs when evaluating one of the first node, the second node, or the at least one other node such that the external information related to the first subject matter, the second subject matter, and the at least one other subject matter is automatically accessed;
   generate the market graphic based on a node that corresponds to the identifier, a set of edges that correspond to the node, and the market graph data structure, the market graphic depicting market relationships between an entity that corresponds to the node and other entities that correspond with other nodes based on the accessed external information;

add ones of the key-value pairs to ones of the first node, the second node, and the at least one other node to reduce future path processing; and provide a second user interface that displays the market graphic.

2. The system of claim 1, wherein the identifier s a ticker symbol corresponding to an organization.

3. The system of claim 1, wherein the market graphic is one of a spreadsheet, a database, chart, table, figure, or a data input file formatted for use by an application.

4. The system of claim 1, wherein the first node, the second node, and the least one other node are graphically represented on the market graphic as one of an organization, a product, or a service.

5. The system of claim 1, wherein the plurality of edges includes at least one of the respective properties and the properties are graphically represented as one of buys, coil ateralizes, franchises, invests, manufactures, originates, owns and operates, powers, sells or leases, sells, or services.

6. The system of claim 1, further comprising instructions to:
obtain the electronic market data from an electronic data source by:
accessing an electronic data repository of the electronic data source; and
analyzing the electronic data repository through use of machine learning to identify data that indicates an entity relationship, wherein the electronic market data includes the data that indicates the entity relationship.

7. The system of claim 6, wherein the instructions to analyze the electronic data repository through use of machine learning further comprises instructions to evaluate the electronic data repository through use of a natural language processor that uses a set of industry-specific semantic libraries to evaluate the electronic data repository.

8. At least one non-transitory computer readable medium including instructions for generating a market graphic using a market graph data structure that, when executed by at least one processor, cause the at least one processor to perform operations to:
provide a first user interface having an interactive query submission user interface element;
receive a query that includes an identifier at the interactive query submission user interface element;
in response to receiving the query at the interactive query submission user interface element, evaluate a relational database using the query to extract a set of entities and corresponding relationships from electronic market data, wherein the relationships define a connection between a first entity and a second entity of the set of entities;
determine a property for each of the relationships;
generate the market graph data structure using the set of entities; relationships, and respective properties for each of the relationships such that the market graph data structure includes links;
analyze the market graph data structure to identify a relationship path between a first node of the market graph data structure and a second node of the market graph data structure, wherein the relationship path includes a plurality of edges, at least one other node, and the first node and the second node are connected by the at least one other node and are not directly connected by an edge, the first node relating to first subject matter, the second node relating to second subject matter, and the at least one other node relating to at least one other subject matter, the at least one other node defining a relationship between the first node and the second node that includes an intermediate path defined by a first path between the first node and the at least one other node and a second path between the at least one other node and the second node;

add key-value pairs that link to external databases associated with the first node, the second node, and the at least one other node via the market graph data structure links, the external databases including external information related to the first subject matter, the second subject matter, and the at least one other subject matter where the market graph data structure includes the key-value pairs and the key-value pairs provide the market graph data links to the external databases such that the market graph structure references the external information at the external database;

automatically access the external databases via the market graph data links provided by the key-value pairs when evaluating one of the first node, the second node, or the at least one other node such that the external information related to the first subject matter, the second subject matter, and the at least one other subject matter is automatically accessed;

generate the market graphic based on a node that corresponds to the identifier, a set of edges that correspond to the node, and the market graph data structure, the market graphic depicting market relationships between an entity that corresponds to the node and other entities that correspond with other nodes based on the accessed external information;

add ones of the key-value pairs to ones of the first node, the second node, and the at least one other node to reduce future path processing; and provide a second user interface that displays the market graphic.

9. The at least one non-transitory computer readable medium of claim 8, wherein the identifier is a ticker symbol corresponding to an organization.

10. The at least one non-transitory computer readable medium of claim 8, wherein the market graphic is one of a spreadsheet, a database, chart, table, figure, or a data input file formatted for use by an application.

11. The at least one non-transitory computer readable medium of claim 8, wherein the first node, the second node, and the least one other node are graphically represented on the market graph data as one of an organization, a product, or a service.

12. The at least one non-transitory computer readable medium of claim 8, wherein the plurality of edges includes at least one of the respective properties and the properties are graphically represented as one of buys, collateralizes, franchises, invests, manufactures, originates, owns and operates, powers, sells or leases, sells, or services.

13. The at least one non-transitory computer readable medium of claim 8, further comprising instructions to:
obtain the electronic market data from an electronic data source by:
accessing an electronic data repository of the electronic data source; and
analyzing the electronic data repository through use of machine learning to identify data that indicates an entity relationship, wherein the electronic market data includes the data that indicates the entity relationship, wherein the instructions to analyze the electronic data repository through use of machine learning further comprises instructions to evaluate the electronic data repository through use of a natural language processor that uses a set of industry-specific semantic libraries to evaluate the electronic data repository.

14. A method for generating a market graphic using a market graph data structure, the method comprising:

provide a first user interface having an interactive query submission user interface element;

receiving a query that includes an identifier at the interactive query submission user interface element;

in response to receiving the query at the interactive query submission user interface element, evaluating a relational database using the query to extract a set of entities and corresponding relationships from electronic market data, wherein the relationships define a connection between a first entity and a second entity of the set of entities;

determining a property for each of the relationships;

generating the market graph data structure using the set of entities, relationships, and respective properties for each of the relationships such that the market graph data structure includes links;

analyzing the market graph data structure to identify a relationship path between a first node of the market graph data structure and a second node of the market graph data structure, wherein the relationship path includes a plurality of edges, at least one other node, and the first node and the second node are connected by the at least one other node and are not directly connected by an edge, the first node relating to first subject matter, the second node relating to second subject matter, and the at least one other node relating to at least one other subject matter, the at least one other node defining a relationship between the first node and the second node that includes an intermediate path defined by a first path between the first node and the at least one other node and a second path between the at least one other node and the second node;

adding key-value pairs that link to external databases associated with the first node, the second node, and the at least one other node via the market graph data structure links, the external databases including external information related to the first subject matter, the second subject matter, and the at least one other subject matter where the market graph data structure includes the key-value pairs and the key-value pairs provide the market graph data links to the external databases such that the market graph structure references the external information at the external database;

automatically accessing the external databases via the market graph data links provided by the key-value pairs when evaluating one of the first node, the second node, or the at least one other node such that the external information related to the first subject matter, the second subject matter, and the at least one other subject matter is automatically accessed;

generating the market graphic based on a node that corresponds to the identifier, a set of edges that correspond to the node, and the market graph data structure, the market graphic depicting market relationships between an entity that corresponds to the node and other entities that correspond with other nodes based on the accessed external information;

adding ones of the key-value pairs to ones of the first node, the second node; and the at least one other node to reduce future path processing and providing a second user interface that displays the market graphic.

15. The method of claim 14, wherein the identifier is a ticker symbol corresponding to an organization.

16. The method of claim 14, wherein the market graphic is one of a spreadsheet, a database, chart, table, figure, or a data input file formatted for use by an application.

17. The method of claim 14, wherein the first node, the second node, and the least one other node are graphically represented on the market graphic as one of an organization, a product, or a service.

18. The method of claim 14, wherein the plurality of edges includes at least one of the respective properties and the properties are graphically represented as one of buys, collateralizes, franchises, invests, manufactures, originates, owns and operates, powers, sells or leases, sells, or services.

19. The method of claim 14, further comprising:

obtaining the electronic market data from an electronic data source by:

accessing an electronic data repository of the electronic data source; and analyzing the electronic data repository through use of machine learning to identify data that indicates an entity relationship, wherein the electronic market data includes the data that indicates the entity relationship.

20. The method of claim 19, wherein the analyzing the electronic data repository through use of machine learning further comprises evaluating the electronic data repository through use of a natural language processor that uses a set of industry-specific semantic libraries to evaluate the electronic data repository.

* * * * *

UNITED STATES PATENT AND TRADEMARK OFFICE
CERTIFICATE OF CORRECTION

| | |
|---|---|
| PATENT NO. | : 11,922,438 B1 |
| APPLICATION NO. | : 17/645934 |
| DATED | : March 5, 2024 |
| INVENTOR(S) | : Henry Buist, III |

It is certified that error appears in the above-identified patent and that said Letters Patent is hereby corrected as shown below:

In the Claims

In Column 16, Line 44, in Claim 1, delete "Least" and insert --least-- therefor

In Column 17, Line 6, in Claim 2, delete "s" and insert --is-- therefor

In Column 17, Lines 17-18, in Claim 5, delete "coil ateralizes," and insert --collateralizes,-- therefor In Column 17, Line 54, in Claim 8, delete "entities;" and insert --entities,-- therefor In Column 20, Line 16, in Claim 14, delete "node;" and insert --node,-- therefor Signed and Sealed this
Fourteenth Day of May, 2024

Katherine Kelly Vidal
*Director of the United States Patent and Trademark Office*